United States Patent
Zhuang et al.

(10) Patent No.: US 9,709,767 B2
(45) Date of Patent: Jul. 18, 2017

(54) OPTICAL FIBER RIBBON RETRACTOR

(71) Applicant: Oplink Communications, LLC, Fremont, CA (US)

(72) Inventors: Lily Yu Zhuang, San Jose, CA (US); Qinhan Li, Wuhan (CN)

(73) Assignee: Oplink Communications, LLC, Fremont, CA (US)

(*) Notice: Subject to any disclaimer, the term of this patent is extended or adjusted under 35 U.S.C. 154(b) by 0 days.

(21) Appl. No.: 14/537,556

(22) Filed: Nov. 10, 2014

(65) Prior Publication Data

US 2015/0131959 A1 May 14, 2015

Related U.S. Application Data

(60) Provisional application No. 61/903,871, filed on Nov. 13, 2013.

(51) Int. Cl.
G02B 6/44 (2006.01)

(52) U.S. Cl.
CPC .......... *G02B 6/4457* (2013.01); *G02B 6/4403* (2013.01); *G02B 6/4446* (2013.01)

(58) Field of Classification Search
CPC ....... G02B 6/4457; H02G 11/02; A45F 5/004; H04M 1/15
USPC ...................... 385/135; 191/12.2 R
See application file for complete search history.

(56) References Cited

U.S. PATENT DOCUMENTS

| | | | |
|---|---|---|---|
| 3,433,579 A * | 3/1969 | Runnion | 312/209 |
| 3,850,002 A * | 11/1974 | Field | 62/67 |
| 4,074,799 A * | 2/1978 | Hishida et al. | 400/208 |
| 4,711,409 A * | 12/1987 | Jones | 242/382.4 |
| 5,147,265 A * | 9/1992 | Pauls et al. | 482/119 |
| 5,268,986 A * | 12/1993 | Kakii | G02B 6/4441 385/135 |
| 6,349,808 B1 * | 2/2002 | Bryant | 191/12.2 R |
| 6,484,958 B1 * | 11/2002 | Xue et al. | 242/378.1 |
| 6,578,683 B1 * | 6/2003 | Burke et al. | 191/12.4 |
| 6,633,770 B1 * | 10/2003 | Gitzinger et al. | 455/575.1 |
| 6,741,784 B1 * | 5/2004 | Guan | G02B 6/4471 385/135 |
| 6,915,058 B2 * | 7/2005 | Pons | 385/135 |
| 7,116,883 B2 * | 10/2006 | Kline et al. | 385/135 |
| 7,195,534 B1 * | 3/2007 | Millman | 446/26 |
| 7,356,237 B2 * | 4/2008 | Mullaney et al. | 385/135 |
| 8,270,152 B2 * | 9/2012 | Haigh | 361/679.33 |
| 2004/0170369 A1 * | 9/2004 | Pons | 385/135 |

(Continued)

FOREIGN PATENT DOCUMENTS

| | | | | |
|---|---|---|---|---|
| EP | 0519210 A2 * | 12/1992 | | G02B 6/3878 |
| EP | 0519210 A3 * | 4/1993 | | G02B 6/3878 |
| EP | 0519210 B1 * | 2/1996 | | G02B 6/3878 |

*Primary Examiner* — Peter Radkowski
(74) *Attorney, Agent, or Firm* — Jeffrey K. Jacobs (57) ABSTRACT

Methods, systems, and apparatus for optical communications. One of the apparatuses includes a spool comprising a spool wheel, one or more separate spool portions positioned on the spool wheel, and one or more bearings positioned on the spool wheel, wherein the one or more spool portions and the one or more bearings are configured such that an optical fiber ribbon can be wound through the spool; and a spring coupled to the spool wheel such that the spring provides a rotational force on the spool in a direction that winds the optical fiber ribbon.

13 Claims, 9 Drawing Sheets

(56) References Cited

U.S. PATENT DOCUMENTS

| | | | |
|---|---|---|---|
| 2004/0200919 A1* | 10/2004 | Burke et al. | 242/378.1 |
| 2005/0242223 A1* | 11/2005 | Woodward | 242/376 |
| 2005/0253011 A1* | 11/2005 | Liao | 242/376.1 |
| 2006/0110119 A1* | 5/2006 | Kline et al. | 385/135 |
| 2006/0210230 A1* | 9/2006 | Kline et al. | 385/135 |
| 2007/0235544 A1* | 10/2007 | Chen et al. | 235/486 |
| 2008/0118207 A1* | 5/2008 | Yamamoto | G02B 6/4457 385/88 |
| 2011/0061981 A1* | 3/2011 | Ori et al. | 191/12.2 R |
| 2014/0284160 A1* | 9/2014 | Towe et al. | 191/12.2 R |

* cited by examiner

OPTICAL FIBER RIBBON RETRACTOR

CROSS-REFERENCE TO RELATED APPLICATIONS

This application claims the benefit under 35 U.S.C. §119(e) of the filing date of U.S. patent application Ser. No. 61/903,871, for "Optical Fiber Ribbon Retractor", which was filed on Nov. 13, 2013, and which is incorporated here by reference.

BACKGROUND

This specification relates to optical communications.

In fiber-optic communications, conventional wavelength-division multiplexing ("WDM") is used to multiplex a number of optical signals into a single optical fiber. The optical signals have different wavelengths. Dense wavelength-division multiplexing ("DWDM") typically has a denser channel spacing as compared to course WDM.

SUMMARY

In general, one innovative aspect of the subject matter described in this specification can be embodied in apparatuses that include a spool comprising a spool wheel, one or more separate spool portions positioned on the spool wheel, and one or more bearings positioned on the spool wheel, wherein the one or more spool portions and the one or more bearings are configured such that an optical fiber ribbon can be wound through the spool; and a spring coupled to the spool wheel such that the spring provides a rotational force on the spool in a direction that winds the optical fiber ribbon.

The foregoing and other embodiments can each optionally include one or more of the following features, alone or in combination. The optical fiber ribbon follows a serpentine path through the spool when wound. Pulling one end of the optical fiber ribbon causes the spool to rotate in a first direction and wherein rotation of the spool in the first direction causes the spring to unwind. A release of tension on the pulled end of the optical fiber ribbon causes the spool to rotate in a second direction in response to a winding force applied by the spring. The apparatus further includes a housing including a base portion and a cap portion, wherein the spool and spring are positioned within the housing.

In general, one innovative aspect of the subject matter described in this specification can be embodied in apparatuses that include a housing; a fiber holder that fixes a first end of an optical fiber ribbon; an interface coupled to a second end of the optical fiber ribbon; and a fiber ribbon retractor positioned between the fiber holder and the interface, wherein the optical fiber ribbon passes through the fiber ribbon retractor, and wherein the fiber ribbon retractor includes a spool for winding a portion of the optical fiber ribbon such that the second end of the optical fiber ribbon can be extended through the interface by unwinding the spool and the extended optical fiber ribbon can be retracted by winding the spool.

The foregoing and other embodiments can each optionally include one or more of the following features, alone or in combination. The apparatus further includes one or more guiding elements forming a path within the housing along which the fiber ribbon retractor can traverse when the fiber ribbon is extended or retracted. The one or more guiding elements each include one or more stoppers at the respective ends of the guiding elements to restrict the movement of the fiber ribbon retractor. The spool of the fiber ribbon retractor further comprises a spool wheel, one or more separate spool portions positioned on the spool wheel, and one or more bearings positioned on the spool wheel, wherein the one or more spool portions and the one or more bearings are configured such that an optical fiber ribbon can be wound through the spool. The fiber ribbon retractor further comprises a spring coupled to the spool wheel such that the spring provides a rotational force on the spool in a direction that winds the optical fiber ribbon. The apparatus further includes a dense wavelength division multiplexer module coupled to the first end of the optical fiber ribbon.

In general, one innovative aspect of the subject matter described in this specification can be embodied in apparatuses that include a spool comprising a spool wheel and one or more separate raised spool portions positioned on the spool wheel, wherein the one or more spool portions and the one or more bearings are configured such that an optical fiber ribbon can be wound through the spool; and a spring holder coupled to the spool wheel, wherein the spring holder houses a spring such that the spring provides a rotational force on the spool in a direction that winds the optical fiber ribbon.

Particular embodiments of the subject matter described in this specification can be implemented so as to realize one or more of the following advantages. The design allows fiber ribbons, which are fragile and cannot be stretched, to be pulled and retracted through a housing.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
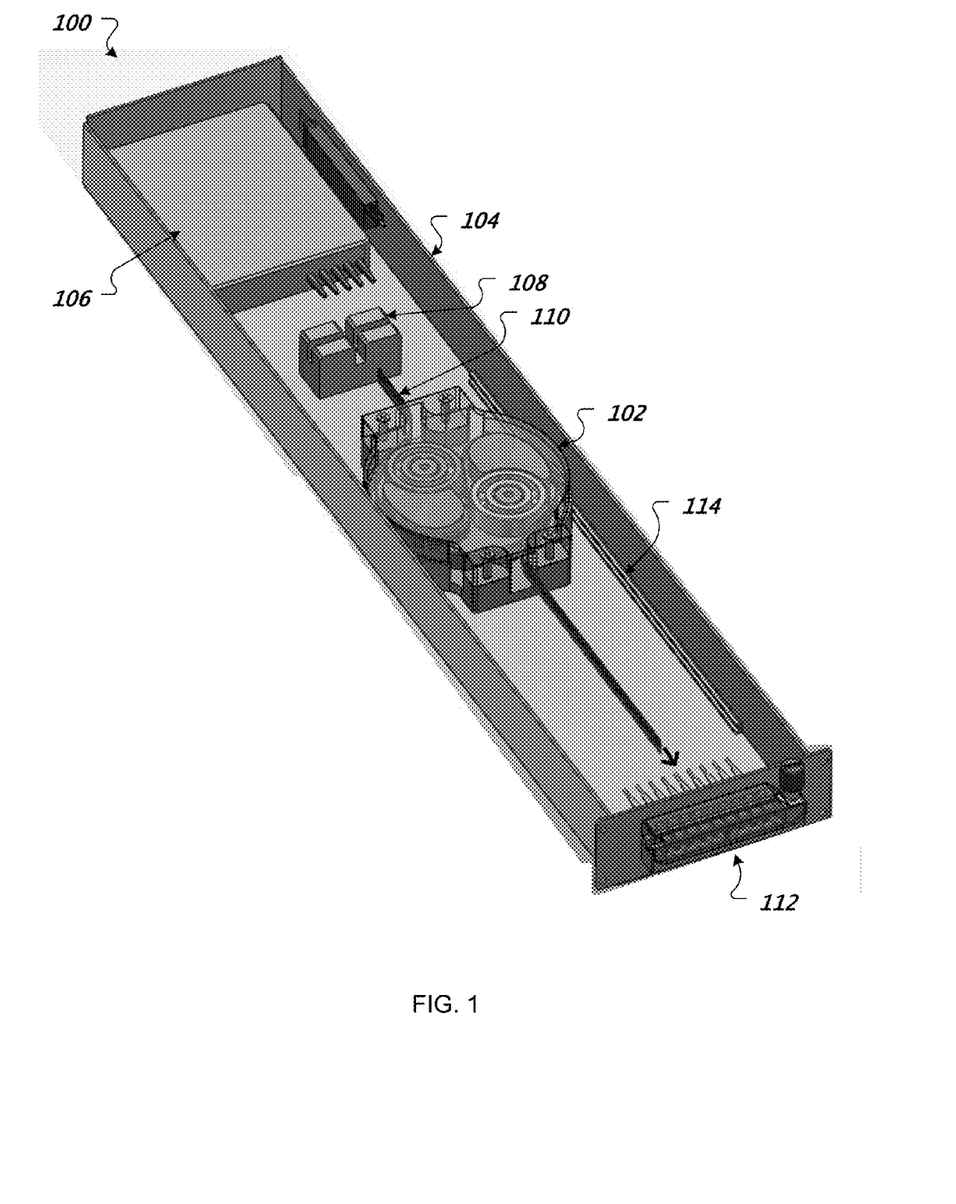
FIG. 1 is a view of an example dense wavelength division multiplexing device including a fiber ribbon retractor.

FIG. 1 is a view of an example dense wavelength division multiplexing ("DWDM") device 100 including a fiber ribbon retractor 102. Dense wavelength division multiplexing is an optical technology that allows for the combining and transmitting of multiple channels having different wavelengths on the same fiber. Using multiple optical fibers, different combinations of wavelength channels can be multiplexed. The DWDM device 100 includes a housing 104. The housing 104 includes an interface 112 for coupling the DWDM device 100 to another optical communications structure, for example, to one or more optical fibers.

Within the housing 104 are positioned a DWDM module 106, a fiber stopping holder 108, and the fiber ribbon retractor 102. The fiber ribbon retractor 102 is coupled to one or more guiding elements 114 positioned along an interior portion of the housing 104. For example, a pair of guiding elements can be positioned on opposite sides of the housing 104 with the fiber ribbon retractor 102 between the guiding elements. The one or more guiding elements 114 provide a path along which the fiber ribbon retractor 102 can move within the housing 104. The one or more guiding elements 114 can include a stopper at each end to prevent further movement of the fiber ribbon retractor 102 in each respective direction.

An optical fiber ribbon 110 is fixed at one end to the fiber stopping holder 108. An optical fiber ribbon is a planar array of optical fibers allowing for a large number of optical fibers to be arranged in a compact flexible structure. The fiber stopping holder 108 anchors one end of the optical fiber ribbon 110. Optical signals to and from the optical fiber ribbon 110 are communicatively coupled from the fiber stopping holder 108 to the DWDM module 106.

The optical fiber ribbon 110 enters one end of the fiber ribbon retractor 102, is wrapped around the fiber ribbon retractor 102, and passes out of a second end of the fiber ribbon retractor 102. Winding and unwinding of the optical fiber ribbon 110 within the fiber ribbon retractor 102 will be described in greater detail below with respect to FIGS. 5 and 6.

The optical fiber ribbon 110 exiting the fiber ribbon retractor 102 is optically coupled to the interface 112. The interface 112 can be pulled from the housing 104 while remaining coupled to the optical fiber ribbon 110. In particular, as the interface 112 is pulled from the housing 104, the optical fiber ribbon 110 is unwound from the fiber ribbon retractor 102. Similarly, as the interface 112 is returned toward the housing 104, the fiber ribbon retractor 102 rewinds the optical fiber ribbon 110 accordingly.

The DWDM device 100 can include other components, which are omitted for clarity of illustration of the fiber ribbon retractor 102.

Figure 2:
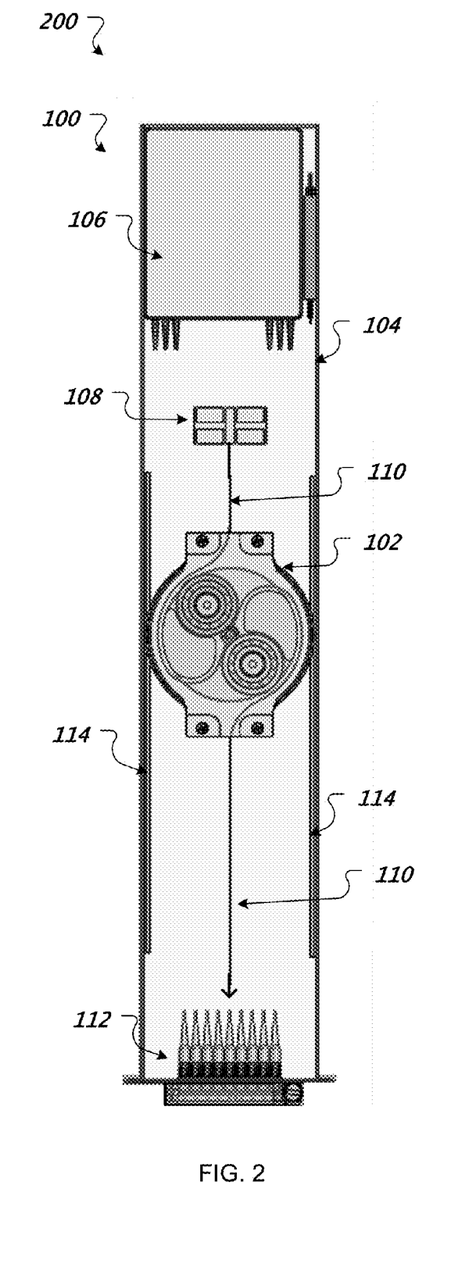
FIG. 2 is a top view of the example dense wavelength division multiplexing device including the fiber ribbon retractor.

FIG. 2 is a top view 200 of the example DWDM device 100. In particular, the top view 200 illustrates a cutaway view of the DWDM device 100 without a top portion of the housing 104 shown.

The top view 200 illustrates the positions of the DWDM module 106 at one end of the DWDM device 100 and the fiber ribbon retractor 102 positioned between the fiber stopping holder 108 and the interface 112. Optional guiding elements 114 are shown along each of the side walls of the housing 104 for guiding the movement of the fiber ribbon retractor 102 within a designated portion of the housing 104 between the fiber stopping holder 108 and the interface 112.

In particular, when the optical fiber ribbon 110 is extended from the interface 112, e.g., in response to a pulling force along the optical fiber ribbon 110 away from the DWDM module 106, the fiber ribbon retractor 102 can move along the guiding elements 114 in the direction of the interface. Moving along the guiding elements is associated with the unwinding of the optical fiber ribbon 110 in the fiber ribbon retractor 102, e.g., unwinding at a back portion of the fiber ribbon retractor 102 closest to the fiber stopping holder 108 creates slack in the optical fiber ribbon 110, allowing the fiber ribbon retractor 102 to move along the guiding elements 114 in the opposite direction. Similarly, when an extended fiber ribbon 110 is retracted back into the housing, e.g., in response to a removal or lessening of the applied pulling force, the fiber ribbon refractor 102 can move along the path provided by the guiding elements 114 in the direction of the fiber stopping holder 108.

The optical fiber ribbon 110 is shown as centered within the housing from the top view and extending from the fiber stopping holder 108 to the interface 112 after passing through the fiber ribbon retractor 102.

Figure 3:
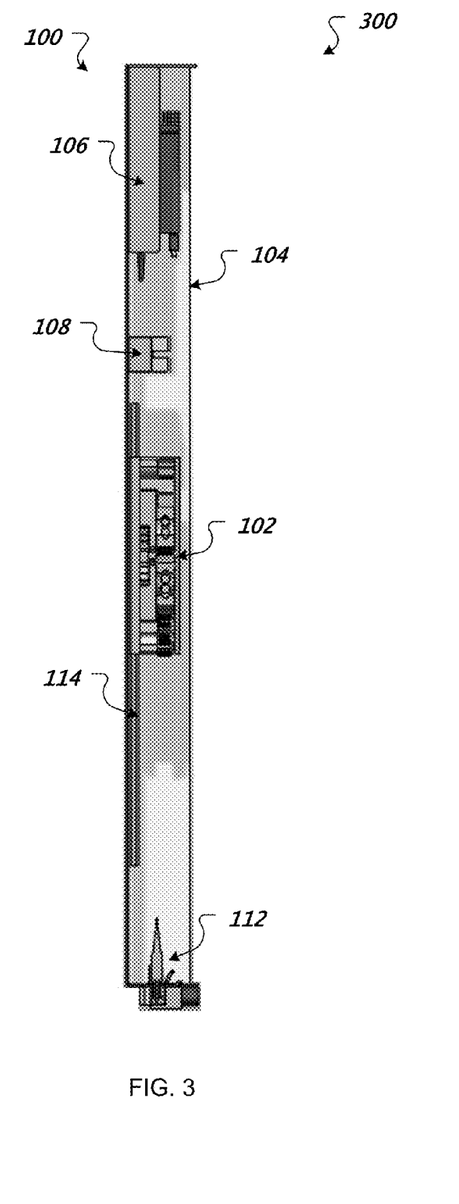
FIG. 3 is a side view along a longitudinal axis of the example dense wavelength division multiplexing device including the fiber ribbon retractor.

FIG. 3 is a side view 300 of the example dense wavelength division multiplexing device 100 along a longitudinal axis. In particular, the side view 300 illustrates a cutaway view of the DWDM device 100 without a side portion of the housing 104 shown. The side view 300 illustrates the positions of the DWDM device 100 components as viewed from the side of the device including the DWDM module 106, fiber stopping holder 108, guiding element 114, fiber ribbon retractor 102, and interface 112. Components including the optical fiber ribbon are omitted for clarity.

Figure 4:
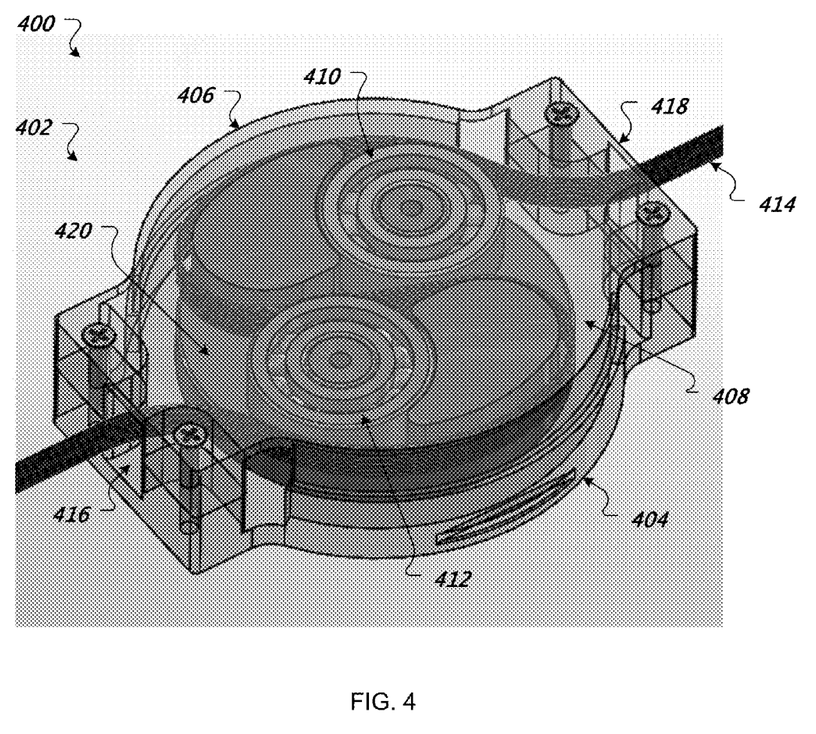
FIG. 4 is a first view of an example fiber ribbon retractor.

FIG. 4 is a first view 400 of an example fiber ribbon retractor 402. The fiber ribbon retractor 402 includes a base 404 and a cap 406 that form a housing of the fiber ribbon retractor 402. The cap 406 is shown semi-transparently to illustrate the internal components. Within the base 404 and cap 406, the fiber ribbon retractor 402 includes a spool 408 and bearings 410 and 412. An optical fiber ribbon 414 enters the fiber ribbon retractor 402 through a first aperture 416 formed by the base 404 and cap 406 at a first end of the fiber ribbon retractor 402. The optical fiber ribbon 414 is wound around the spool 408 along a serpentine path that weaves the optical fiber ribbon 414 around, and between, two raised portions of the spool 408 that are mounted atop a spool wheel 420. The optical fiber ribbon 414 exits the fiber ribbon retractor 402 through a second aperture 418 formed by the base 404 and cap 406 at a second end of the fiber ribbon retractor 402 opposite the first end.

Figure 5:
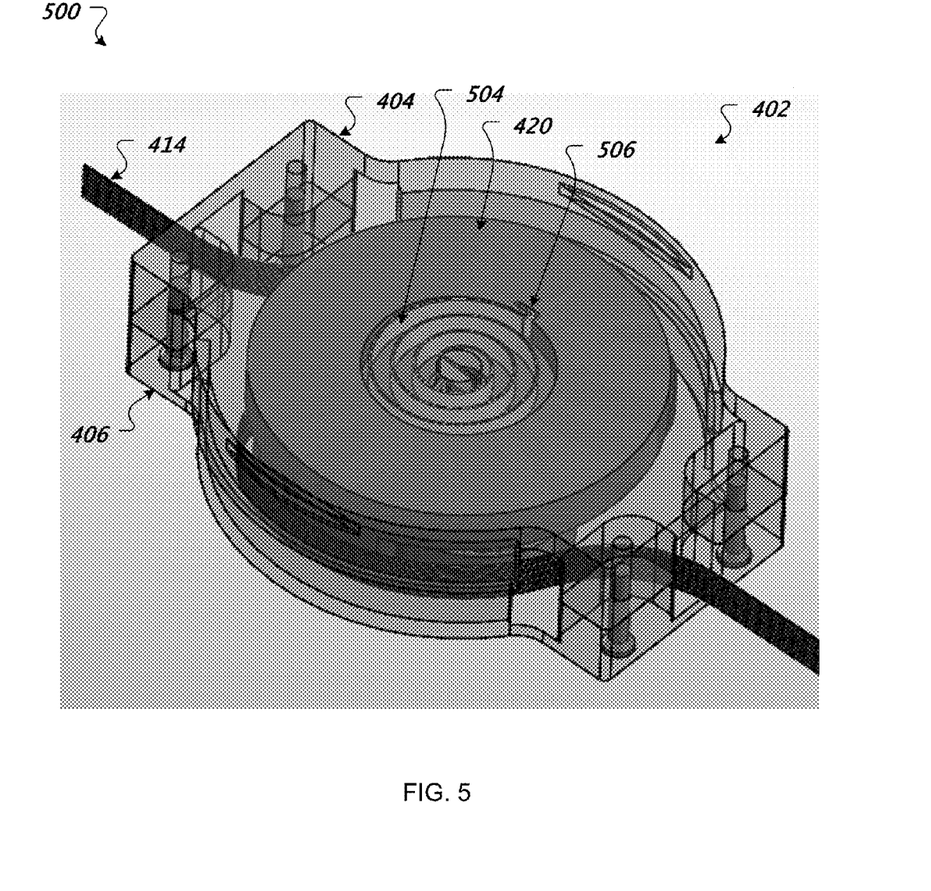
FIG. 5 is a second view of the example fiber ribbon retractor of FIG. 5.

When the optical fiber ribbon 406 is being pulled, e.g., though the interface 112 of FIG. 1, the spool 408 rotates to unwind the optical fiber ribbon 414. In the example shown in FIG. 4, the spool 408 rotates in a clockwise direction. Similarly, when the optical fiber ribbon 414 is being returned, e.g., through a loss of tension in the optical fiber ribbon 414, the spool 408 rotates in a counterclockwise direction to wind the optical fiber ribbon 414. The rotation to wind the optical fiber ribbon 414 is facilitated by a spring, which is shown in FIG. 5. Thus, when the optical fiber ribbon 414 is fully extended, the spool 408 is rotated such that the optical fiber ribbon 414 roughly passes directly through the spool in line with the first and second apertures 416 and 418. However, when wound, the spool 408 is rotated such that more of the optical fiber ribbon 414 is in contact with the spool surface including the outer surface of the spool 408.

FIG. 5 is a second view 500 of the example fiber ribbon refractor 402, e.g., from an opposing side of the fiber ribbon retractor 402 as compared to the first view 400 of FIG. 4. The fiber ribbon retractor 402 in the second view 500 also shows the base 404 and cap 406 of the fiber ribbon retractor 402. The base 404 is shown semi-transparently to illustrate the internal components from the second view 500, e.g., from a bottom perspective. In particular, a bottom side of the spool wheel 420 and a spring 504 are shown. The spring 504 is positioned within the center of the spool wheel 420 and is coupled to the spool wheel 420 at one end 506 of the spring 504. Although not shown, the spool wheel 420 is coupled to the raised portions of the spool 408 such that rotation of the spool 408 results in a corresponding rotation of the spool wheel 420 and vice versa. The spring 408 is configured to apply a rotational force to the spool 408 in a direction that tightens the winding of the optical fiber ribbon 414.

When the optical fiber ribbon 414 is being pulled, the spool 408 rotates to unwind the optical fiber ribbon 414. This causes a corresponding rotation of the spool wheel 420. As the spool wheel 420 rotates, the spring 504 is unwound. The spring 504 exerts a counter force in the opposite direction to restore the spring shape. If the tension extending the optical fiber ribbon 414 is relaxed, the force exerted by the spring 504 winds the spool 408 clockwise to remove slack in the optical fiber ribbon 414.

Figure 6:
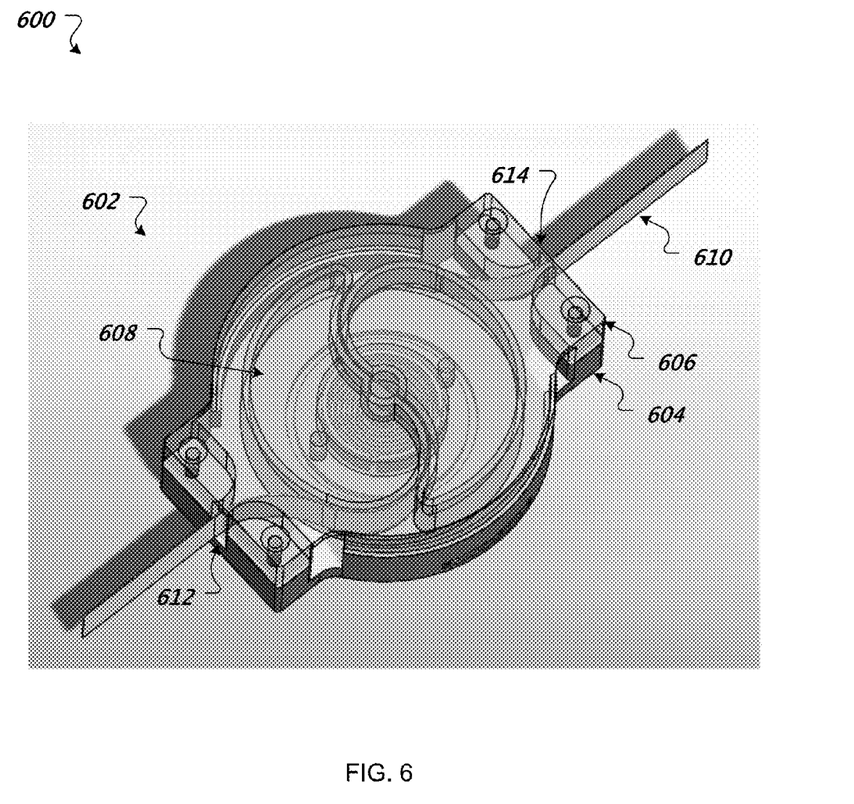
FIG. 6 is a first view of another example fiber ribbon retractor.

FIG. 6 is a first view 600 of another example fiber ribbon retractor 602. The fiber ribbon retractor 602 includes a housing having a base 604 and a cap 606 that form a housing of the fiber ribbon retractor 602. The cap 606 and internal components are shown semi-transparently to illustrate the components of the fiber ribbon retractor 602. Within the housing, a spool and spring assembly 608 is shown. The spool and spring assembly 608 includes a spool and a spring, which will be described in greater detail with respect to FIGS. 7-10.

An optical fiber ribbon 610 enters the fiber ribbon retractor 602 through a first aperture 612 formed by the base 604 and cap 606 at a first end of the fiber ribbon retractor 602. The optical fiber ribbon 610 is wound around the spool of the spool and spring assembly 608 along a serpentine path that weaves the optical fiber ribbon 610 around, and between, two portions of the spool and spring assembly 608. The optical fiber ribbon 610 exits the fiber ribbon retractor 602 through a second aperture 614 formed by the base 604 and cap 606 at a second end of the fiber ribbon retractor 602 opposite the first end.

When the optical fiber ribbon 610 is being pulled, e.g., though the interface 112 of FIG. 1, the spool and spring assembly 608 rotates to unwind the optical fiber ribbon 610. In the example shown in FIG. 6, the spool rotates in a clockwise direction. Similarly, when the optical fiber ribbon 610 is being returned, e.g., though a loss of tension in the optical fiber ribbon 610, the spool rotates in a counterclockwise direction to wind the optical fiber ribbon 610. The rotation to wind the optical fiber ribbon 610 is facilitated by a spring of the spool and spring assembly 608. Thus, when the optical fiber ribbon 610 is fully extended, the spool is rotated such that the optical fiber ribbon 610 roughly passes directly through the spool in line with the first and second apertures 612 and 614. However, when wound, the spool is rotated such that more of the optical fiber ribbon 610 is in contact with the spool surface including the outer surface of the spool.

Figure 7:
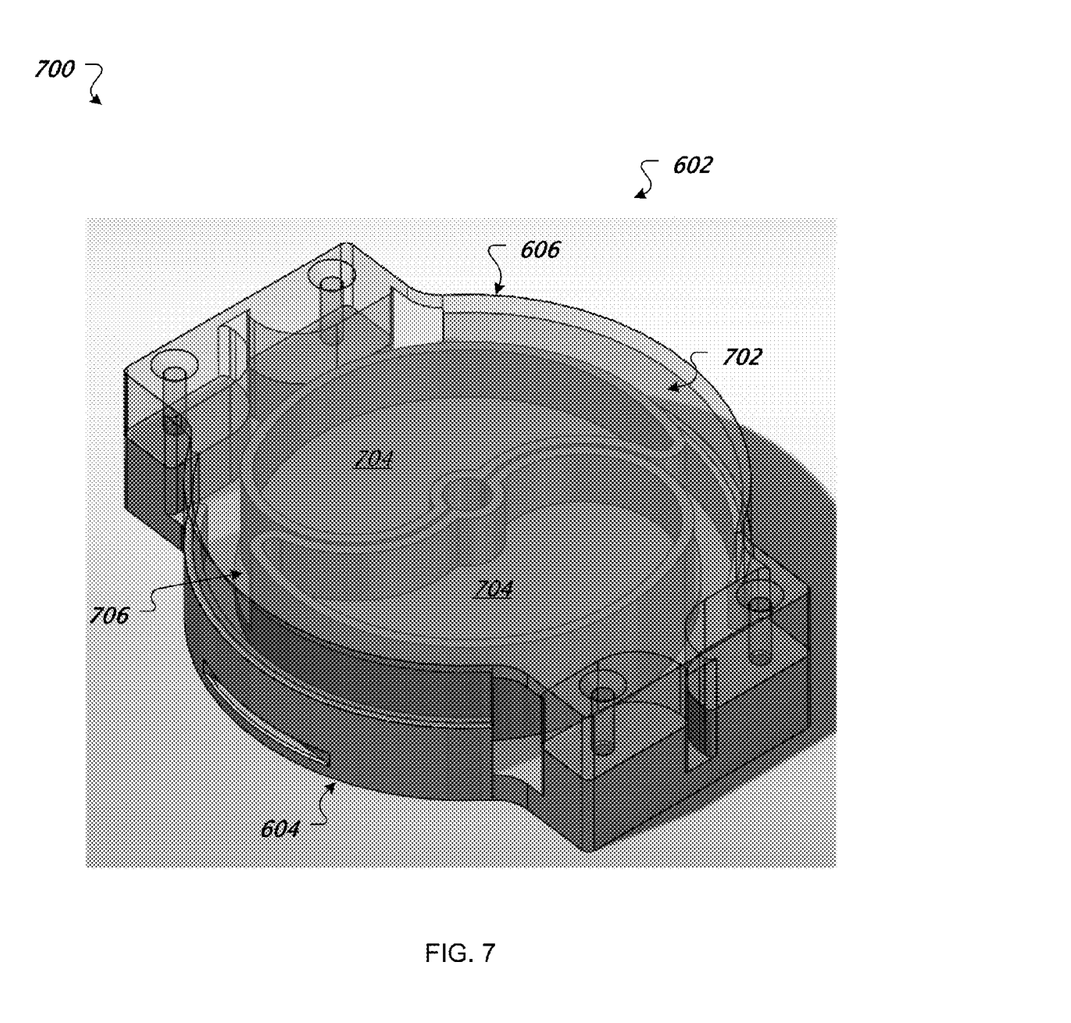
FIG. 7 is a second view of the example fiber ribbon retractor of FIG. 7.

FIG. 7 is a second view 700 of the fiber ribbon retractor 602 of FIG. 6. The cap 606 is shown semi-transparently to illustrate the components of the fiber ribbon retractor 602. Within the base 604 and cap 606, the fiber ribbon retractor 602 includes a spool 702. The spool 702 includes two raised portions 704 positioned on a spool wheel 706. The raised portions 704 are separated by a serpentine channel in which the optical fiber ribbon 610 (not shown) traverses and rotate together with the spool wheel 706 during winding or unwinding of the optical fiber ribbon 610. The raised portions 704 are shown as having raised edges rather than solid, however in other implementations, the raised portions can be solid or partially filled depending on the application. When the spool 702 is rotated to wind the optical fiber ribbon 610, the optical fiber ribbon is further in contact with portions of the outer surface of the raised portions 704.

Figure 8:
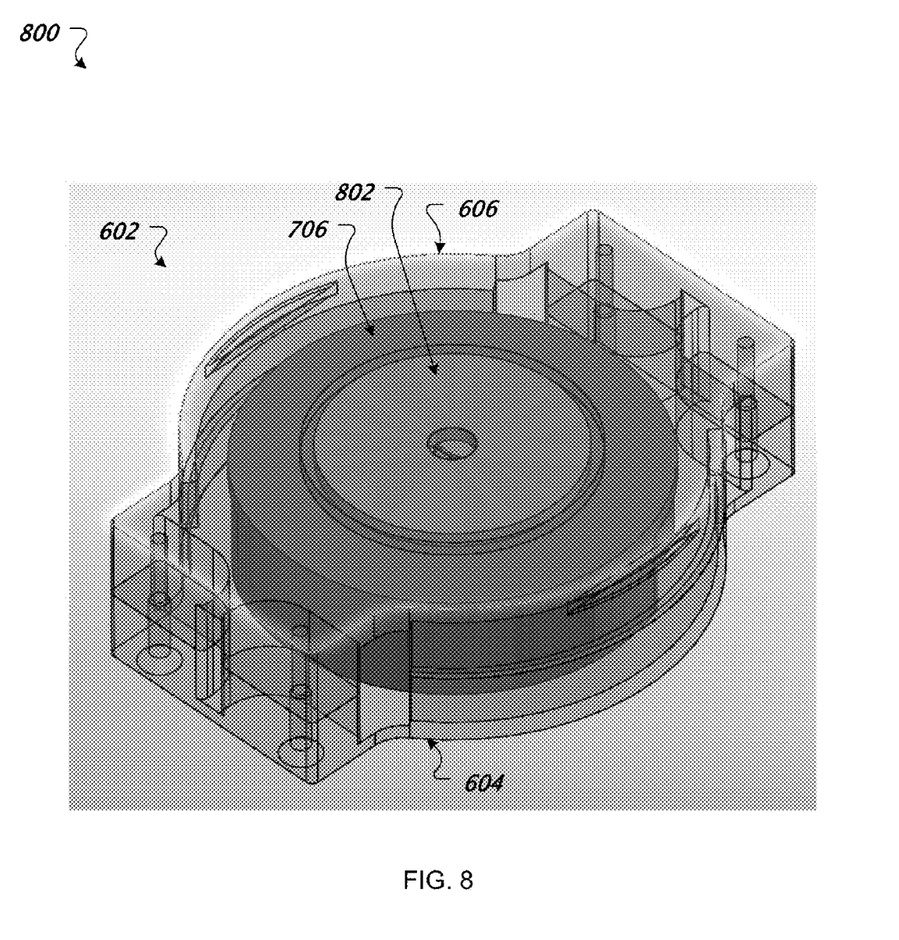
FIG. 8 is a third view of the example fiber ribbon retractor of FIG. 7.

FIG. 8 is a third view 800 of the fiber ribbon retractor 602 of FIG. 6. The fiber ribbon retractor 602 in the third view 800 also shows the base 604 and cap 606 of the fiber ribbon retractor 602. The base 604 and cap 606 are shown semi-transparently to illustrate the internal components from the third view 800, e.g., from a bottom perspective. In particular, a bottom side of the spool wheel 706 and a spring holder 802 are shown. The spring holder 802 is positioned partially within a recess of the spool wheel 706 (not shown). A spring is positioned within the center of the spring holder 802 and is coupled to the spring holder 802 at one end of the spring. The spring holder is coupled to the spool wheel 706 such that rotation of the spool wheel 706 results in a corresponding rotation of the spring. The spring is configured to apply a rotational force to the spool holder 802, and consequently the spool wheel 706 in a direction that tightens the winding of the optical fiber ribbon 610.

When the optical fiber ribbon 610 is being pulled, the spool 702 rotates to unwind the optical fiber ribbon 610. This causes a corresponding rotation of the spool wheel 706. As the spool wheel 706 rotates, the spring holder 802 rotates with it. This rotation of the spring holder 802 causes the spring to unwind. The spring exerts a counter force in the opposite direction to restore the spring shape. If the tension extending the optical fiber ribbon 610 is relaxed, the force exerted by the spring rotates the spool wheel 706 to wind the spool 702 and remove slack in the optical fiber ribbon 610.

Figure 9:
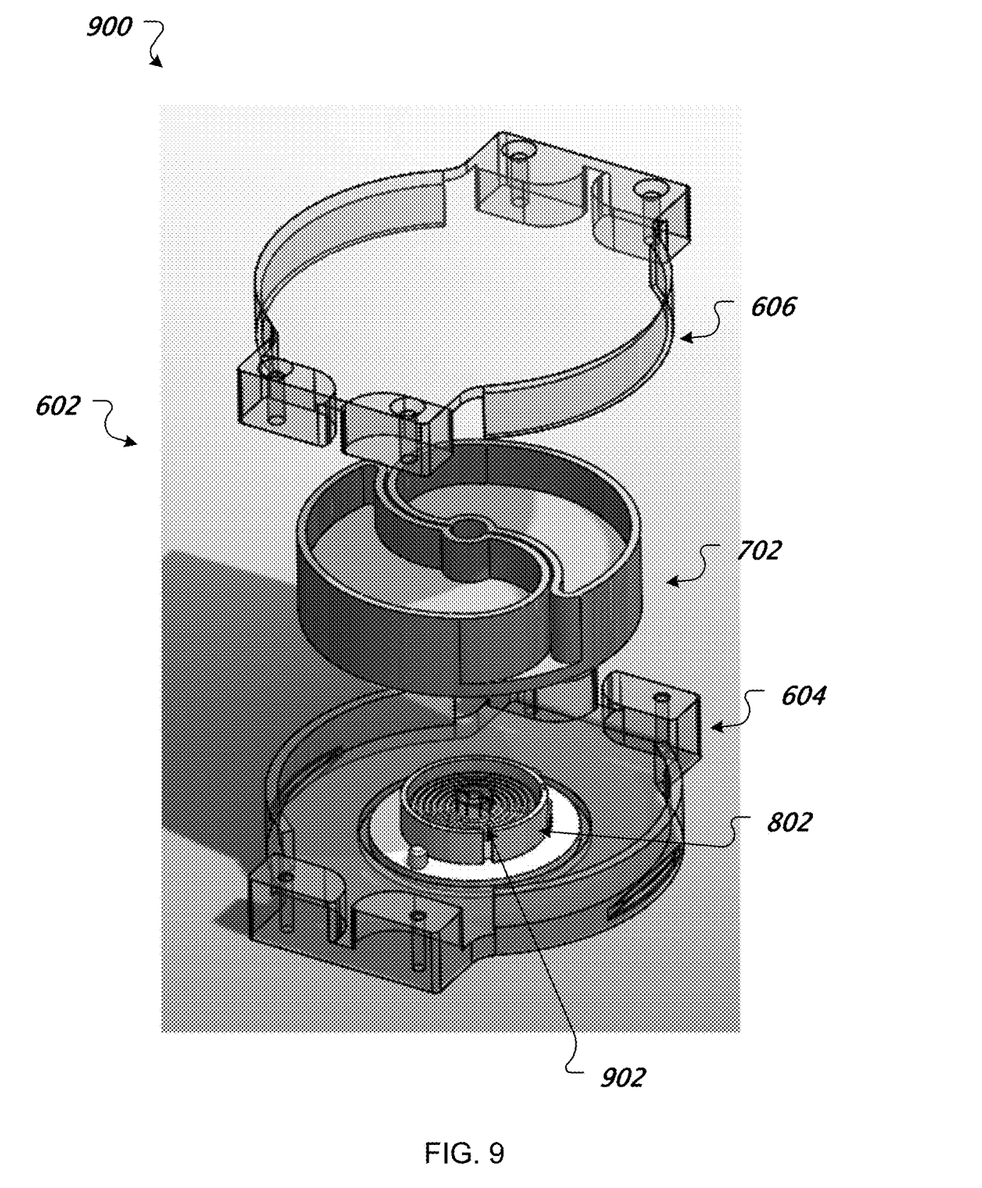
FIG. 9 is an exploded view of the example fiber ribbon retractor of FIG. 7.

FIG. 9 is an exploded view 900 of the fiber ribbon retractor 602 of FIG. 6. The exploded view 900 illustrates how the components of the fiber ribbon retractor 602 fit together relative to each other. In particular, the exploded view 900 shows the cap 606, the spool 702, and the base 604. Additionally, the base 604 shows the spring holder 802 and a spring 902 positioned within the spring holder 802. The spring 902 is attached at one end to the spring holder 802 and to a fixed point at a second end such that rotation of the spring holder 802 results in a corresponding winding or unwinding of the spring 902.

Figure 10:
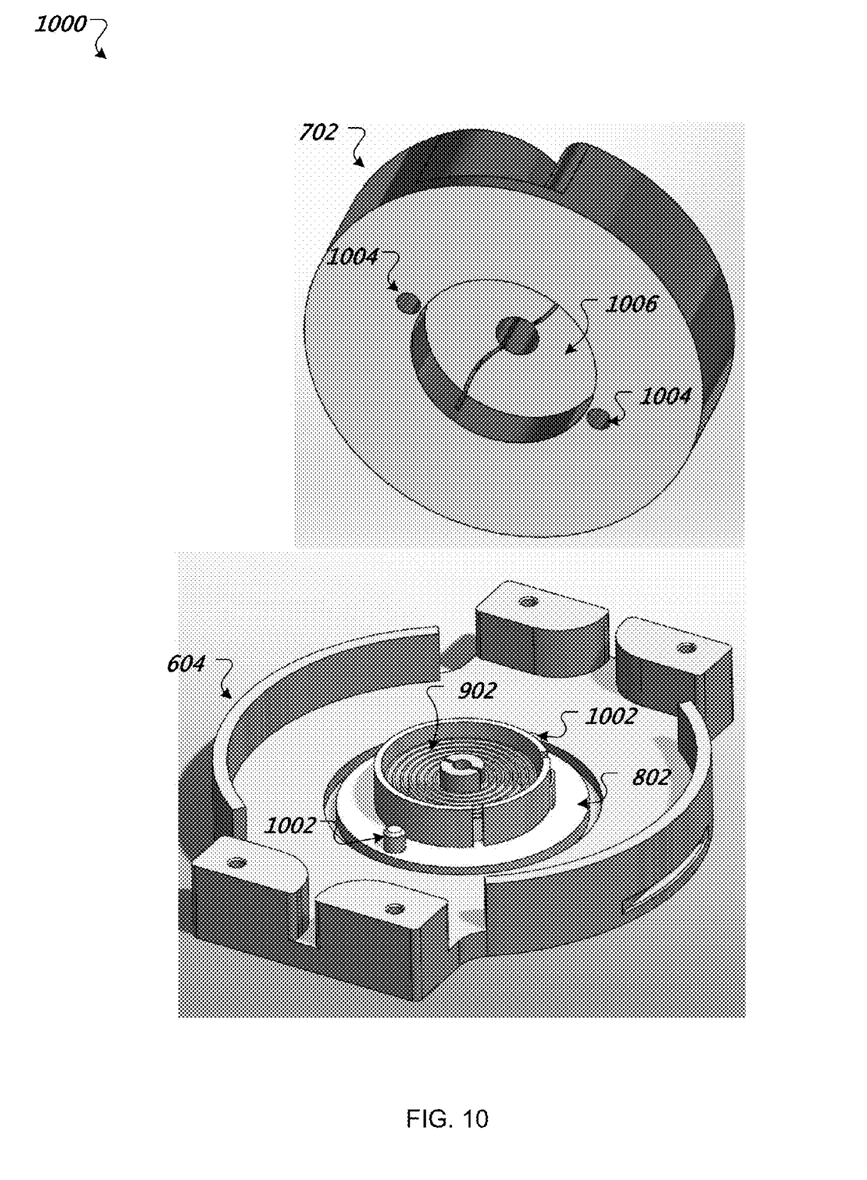
FIG. 10 is an exploded view of an example spool and spring assembly.

FIG. 10 is an exploded view 1000 of a spool and spring assembly. The spool and spring assembly includes the spool 702, spring holder 802, and spring 902. The spring holder 802 and spring 902 are configured to be partially inserted within a recess 1006 of the spool 702. The spring holder 802 and spring 902 are shown positioned on the base 604. Additionally, protrusions 1002 are shown as part of the spring holder 802. The protrusions 1002 are configured to fit within corresponding recesses 1004 in the spool 702. This locks the spring holder 802 to the spool 702 such that they rotate together during winding or unwinding of an optical fiber ribbon.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An optical fiber ribbon retractor apparatus comprising:
   a spool comprising a spool wheel, one or more separate raised spool portions positioned on the spool wheel, and one or more bearings positioned on the spool wheel, wherein the one or more spool portions and the one or more bearings are configured to guide an optical fiber ribbon through the spool;
   a spring coupled to the spool wheel such that the spring provides a rotational force on the spool in a direction that winds the optical fiber ribbon;
   a housing, wherein the spool and the spring are positioned within the housing; and
   an interface optically coupled to a first end of the optical fiber ribbon, the interface being detachable from the housing while remaining optically coupled to the optical fiber ribbon.

2. The fiber ribbon retractor apparatus of claim 1, wherein the optical fiber ribbon follows a serpentine path through the spool when wound.

3. The fiber ribbon retractor apparatus of claim 1, wherein pulling one end of the optical fiber ribbon causes the spool to rotate in a first direction and wherein rotation of the spool in the first direction causes the spring to unwind.

4. The fiber ribbon retractor apparatus of claim 3, wherein a release of tension on the pulled end of the optical fiber ribbon causes the spool to rotate in a second direction in response to a winding force applied by the spring.

5. The fiber ribbon retractor apparatus of claim 1, wherein the housing includes a base portion and a cap portion.

6. An apparatus comprising:
   a housing;
   a fiber holder that fixes a first end of an optical fiber ribbon;
   an interface optically coupled to a second end of the optical fiber ribbon, the interface being detachable from the housing while remaining optically coupled to the optical fiber ribbon;
   a fiber ribbon retractor positioned between the fiber holder and the interface, wherein the optical fiber ribbon passes through the fiber ribbon retractor; and
   one or more guiding elements forming a path within the housing along which the fiber ribbon retractor can traverse when the fiber ribbon is extended or retracted, and
   wherein the fiber ribbon retractor includes a spool for winding a portion of the optical fiber ribbon such that the second end of the optical fiber ribbon can be extended through the interface by unwinding the spool and the extended optical fiber ribbon can be retracted by winding the spool.

7. The apparatus of claim 6, wherein the one or more guiding elements each include one or more stoppers at the respective ends of the guiding elements to restrict the movement of the fiber ribbon retractor.

8. The apparatus of claim 6, wherein the spool of the fiber ribbon retractor further comprises a spool wheel, one or more separate spool portions positioned on the spool wheel, and one or more bearings positioned on the spool wheel, wherein the one or more spool portions and the one or more bearings are configured such that an optical fiber ribbon can be wound through the spool.

9. The apparatus of claim 8, wherein the fiber ribbon retractor further comprises a spring coupled to the spool wheel such that the spring provides a rotational force on the spool in a direction that winds the optical fiber ribbon.

10. The apparatus of claim 6, further comprising a dense wavelength division multiplexer module coupled to the first end of the optical fiber ribbon.

11. The apparatus of claim 1, further comprising:
   an optical fiber holder that anchors a second end of the optical fiber ribbon; and
   a dense wavelength division multiplexer module communicatively coupled to the second end of the optical fiber ribbon via the optical fiber holder.

12. The apparatus of claim 11, wherein the optical fiber holder and the dense wavelength division multiplexer module are positioned within the housing.

13. An apparatus comprising:
   a housing;
   a fiber holder that fixes a first end of an optical fiber ribbon, wherein the optical fiber ribbon is a planar array of at least three optical fibers arranged in a compact flexible structure;
   an interface coupled to a second end of the optical fiber ribbon;
   a fiber ribbon retractor positioned between the fiber holder and the interface, wherein the optical fiber ribbon passes through the fiber ribbon retractor; and
   one or more guiding elements forming a path within the housing along which the fiber ribbon retractor can traverse when the fiber ribbon is extended or retracted, and
   wherein the fiber ribbon retractor includes a spool for winding a portion of the optical fiber ribbon such that the second end of the optical fiber ribbon can be extended through the interface by unwinding the spool and the extended optical fiber ribbon can be retracted by winding the spool.

* * * * *